United States Patent [19]

O'Sullivan

[11] 3,735,241

[45] May 22, 1973

[54] POLY-PHASE DIGITAL CONTROLLER

[75] Inventor: George O'Sullivan, Pottersville, N.J.

[73] Assignee: Tenney Engineering, Inc., Union, N.J.

[22] Filed: Dec. 28, 1971

[21] Appl. No.: 213,027

[52] U.S. Cl. ..................323/22 SC, 321/47, 323/24, 307/252 Q, 307/252 UA

[51] Int. Cl. ..................G05f 1/44

[58] Field of Search ..................321/5, 18, 47; 323/22 SC, 24, 34–36; 307/252 Q, 252 UA

[56] References Cited

UNITED STATES PATENTS

| | | | |
|---|---|---|---|
| 3,579,080 | 5/1971 | Vollrath | 321/5 |
| 3,593,105 | 7/1971 | Brohaugh | 321/5 |
| 3,611,097 | 10/1971 | Joslyn | 323/24 X |

*Primary Examiner*—Gerald Goldberg
*Attorney*—Howard T. Jeandron

[57] ABSTRACT

A polyphase digital controller comprised of circuitry to generate and count a group of digital clock pulses with the first pulse being counted after the zero crossing of the primary voltage. The number of pulses in the group is proportional to the control function representing (SCR) silicon controlled rectifiers off time. These clock pulses are counted by an up counter which is used to set an individual down counter in each phase. The up counter operates six times during each 360° of the input line. This setting of the down counters occurs when the primary voltage associated with the individual phase of each counter crosses zero. This zero crossing also starts the down counter associated with that phase, counting a clock frequency that is one-third the frequency of the up counter clock. When the down counter reaches zero it supplies a signal to fire the SCR controlling that phase.

4 Claims, 10 Drawing Figures

INVENTOR.
GEORGE O'SULLIVAN
BY Howard T. Jeandron
AGENT

Patented May 22, 1973

3,735,241

2 Sheets-Sheet 2

INVENTOR.
GEORGE O'SULLIVAN
BY Howard T. Jeandron
AGENT

POLY-PHASE DIGITAL CONTROLLER

This invention relates to circuitry in which polyphase power is controlled to provide equal loading of each phase, this equal loading is accomplished by digital counting technique which is employed to determine the firing time of controlled SCR's. Equal loading minimizes the ripple voltage to the load and the use of digital techniques eliminate balance adjustments peculiar to analog SCR control systems.

In the prior art the means of controlling power for consumption has been with polyphase SCR circuitry. For example, in a three phase system, three SCR's are provided, one for control of the power delivered by each phase. The power delivered by these individual SCR's is a function of the time current flows through them during each cycle. The means of control may be an error voltage or feedback voltage which is used by each of the three control circuits to generate this SCR on time. Since variations occur between these three circuits, their timings are not identical giving rise to unbalances in the power delivered by the three SCRs. To overcome this unbalance, adjustments are provided in the individual timing circuits which do not remain balanced and therefore must be frequently readjusted if balance is to be maintained.

It is an object of this invention to eliminate the balancing adjustments previously necessary in SCR polyphase systems.

It is a further object of this invention to provide a means of producing a balanced load to all phases of a polyphase system.

A still further object of this invention is to provide a polyphase power control in which a conversion is made to DC in which a balance between the phases provides a minimum ripple content on the DC output.

A further object of this invention is to provide a much smaller configuration of a polyphase control circuit through the use of integrated circuits.

A still further object of this invention is to provide a polyphase control circuit that provides a better control at a lower cost.

A still further object of this invention is to provide a digital controller to provide its inherent precise characteristics.

Figure 1:
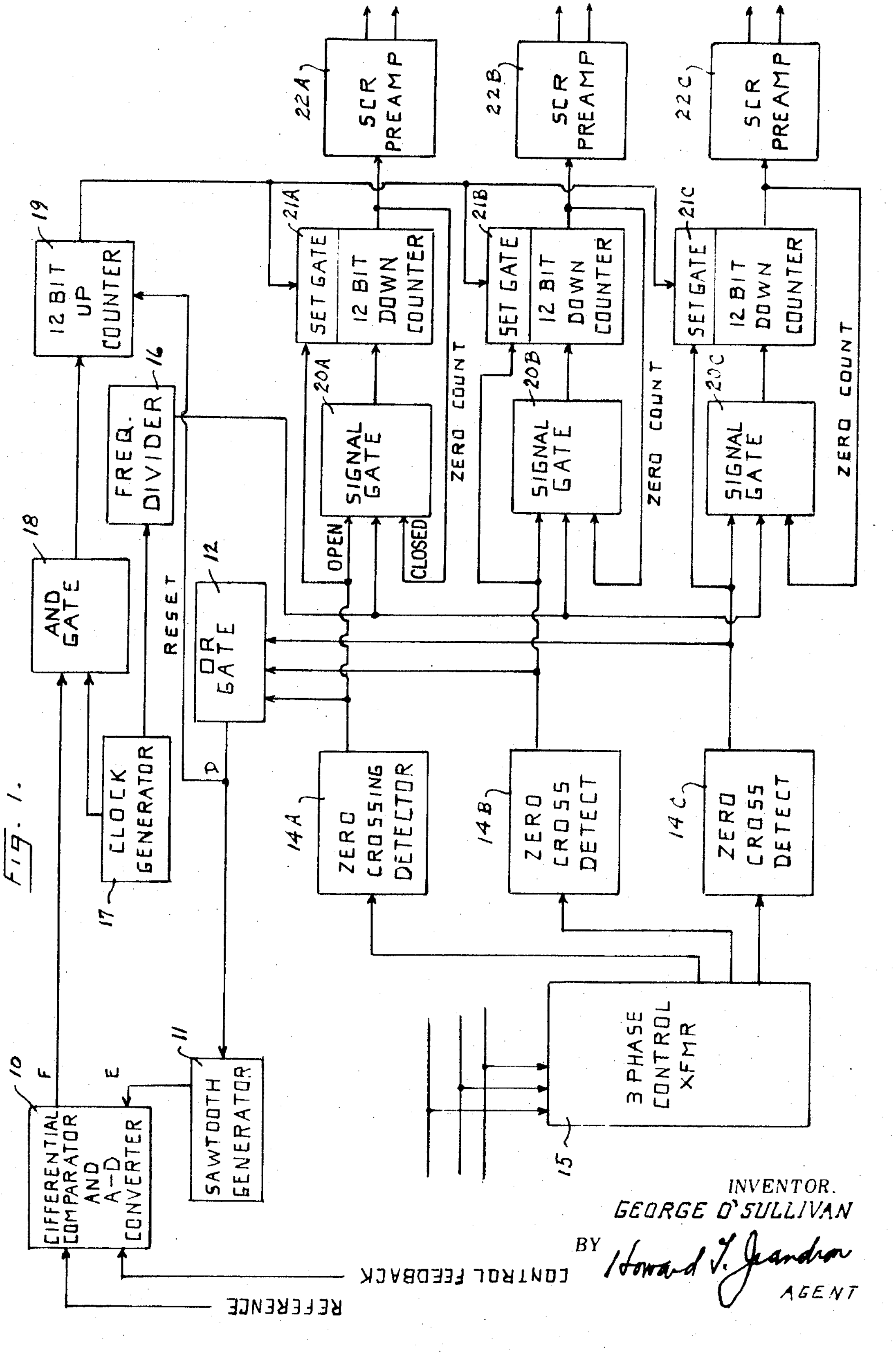
Figures 2A, 2B, 2C, 2D, 2E, 2F, 2G, 2H, 2I:
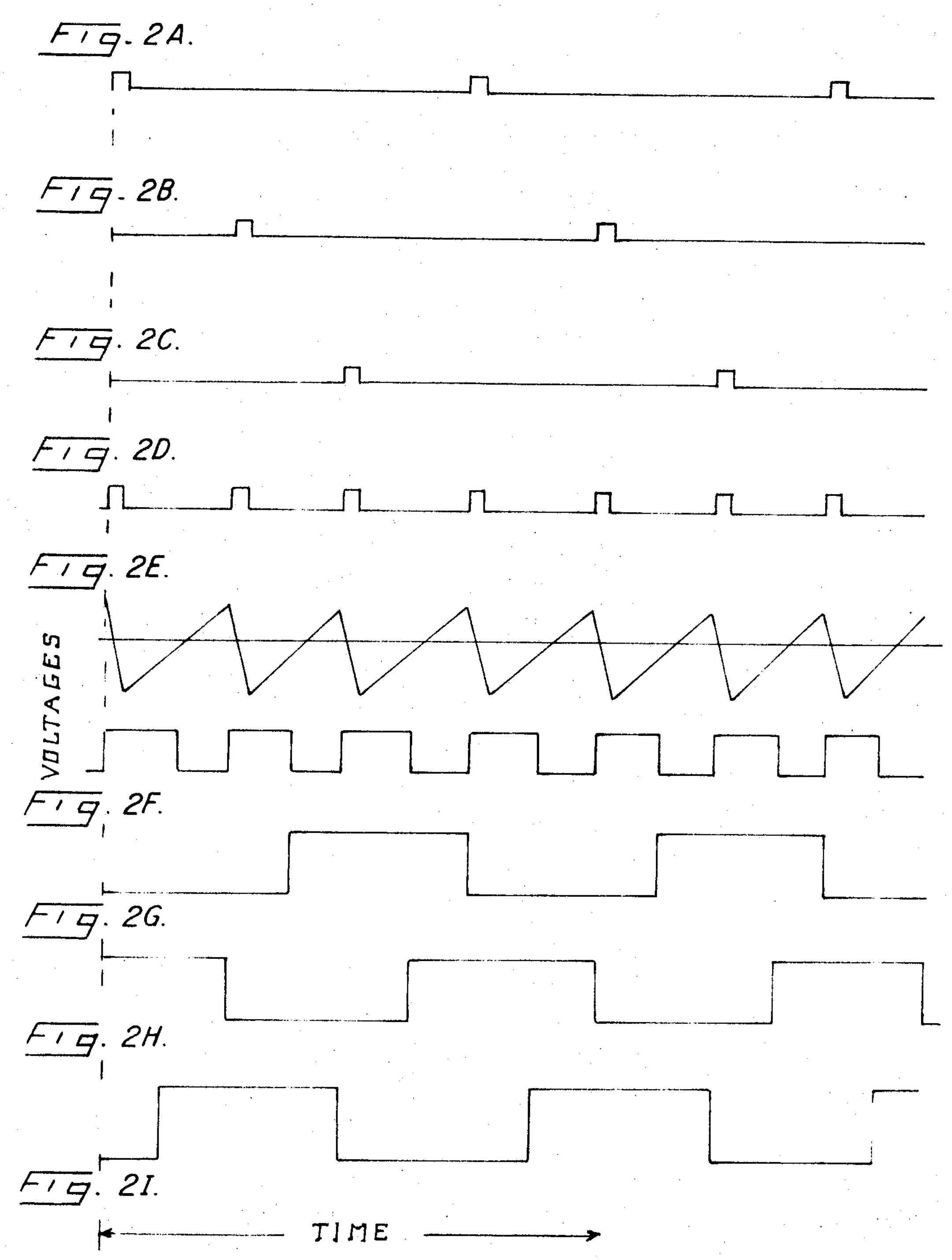

Other objects of this invention shall be apparent by reference to the accompanying detailed description and the drawings in which FIG. 1 is a schematic block diagram of a three phase SCR control circuit, and FIGS. 2A–2I are diagrammatic illustrations of wave forms produced by the circuit illustrated in FIG. 1.

In the past it has been the practice to provide a separate SRC control circuit for each phase involve. Because of variations experienced between the performance of these multiple control systems, balancing arrangements have been provided. In the past, due to inherent circuit instabilities, the amount of correction required from the balancing circuit did not remain a constant value. Therefore, once a balance was achieved, it was not maintained for a reasonable length of time. If such an unbalace circuit arrangement were employed to provide a conversion to DC, this unbalance would give rise to an excessive ripple polyphase in the DC output. In olyphase control circuits as known in the past, because of the extensive use of discreet component parts, many more parts were required with the attendant disadvantages of greater power dissipation, more inter connections and larger size.

Use of digital circuits provides a high degree of isolation from detrimental environmental conditions upon the performance of the system to provide a better control.

Referring to FIG. 1, there is illustrated a block diagram of a digital control circuit specifically shown as a three phase control circuit which will result in controlled voltages to the SCR associated with each of the three phases in which the following components are a differential comparator and analog to digital converter 10, a sawtooth generator 11, an (OR) gate 12, three zero crossing detectors 14A, B and C, a three phase control transformer 15, frequency divider 16, a clock generator 17, an (AND) gate 18, a (12 bit) up counter 19, three set-reset gates 20A, B and C, three (12 bit) down counters with set gates 21A, B and C, three SCR pre-amplifiers 22A, B and C and appropriate interconnections. FIG. 1 contains the following illustrated circuit elements: element 10, the differential comparator and A-D converter which performs the function of varying the DC level at its output F, of the input signal at E, as modified by the relationship between the reference and control feedback inputs said control feedback input being derived from sensing the output developed by the polyphase digital controller. Element 11, the sawtooth generator, provides a linear varying output voltage E whose value is returned to the starting level with the receipt of each synchronizing pulse at its input, which provides a waveform as shown at E of FIG. 2.

Gate element 12 of FIG. 1, provides an output D which is a pulse each time an input pulse appears at any one of its three inputs. These inputs are shown on FIG. 2 as A, B and C with the resultant output as D.

Elements 14A, 14B and 14C, the zero crossing detectors, each provide a pulse output when the cyclic voltage appearing at the input reverses its polarity. These outputs are shown as voltage waveforms A, B and C of FIG. 2.

Element 15, the three phase control transformer, provides appropriate input voltages to the zero crossing detectors 14A, 14B and 14C with DC isolation and a minimum of phase distortion from the three phase power source.

Element 16, a frequency divider by three, provides one output pulse for each three pulses appearing at its input. When driven by the clock generator, element 17 of FIG. 1, the frequency divider provides output pulses at an 0.37 MHz rate.

The clock generator, element 17 of FIG. 1, provides output pulses at a rate of approximately 1.11 MHz, which rate is relatively independent of environmental factors and circuit loading conditions.

Element 18 of FIG. 1, the gate, provides an output that is a function of the sum of its two input signals. Signals must be present at both inputs to provide an output signal.

Element 19 is a 12 bit up counter which provides a binary coded output of the sum of the number of pulses appearing at its input after the receipt of the reset pulse. Although a 12 bit up counter has been chosen, a counter of greater or lesser bit count may also be used.

Signal gate elements 20A, 20B and 20C each provide an output equivalent to its input during the period between the receipt of the "Gate open" and the "Gate Close" pulses at the gate input.

Elements 21A, 21B and 21C, the (12 bit) down counters each provide a pulse output when the internal count reaches zero, starting from a setting of the 12 bit binary count set into the counters by a set pulse. If an up counter of greater or lesser bit count is chosen then the down counter shall be chosen to equal the count of the up counter.

Elements 22A, 22B and 22C, the SCR pre-amplifiers, perform the function of raising their input level to a value sufficient to control the SCR firing. Having identified and described the elements of the circuit in FIG. 1, the specific relationship between these elements to accomplish the control follows.

Control of power with SCRS depends upon the delay time after the supply voltage crosses zero before the appropriate SCR is fired. An increase in power is delivered to the load by the SCR when this delay is decreased, and conversely, the delivered power is decreased for an increase in delay up to 180° in phase angle.

The timing delay is started each time one of the three phase voltages passes through zero, which initiates the start with a pulse. These pulses appear at D on FIG. 1 and their representative wave form is shown at D on FIG. 2. This waveform D is the sum of waveforms A, B and C, the outputs of elements 14A, 14B and 14C, the zero crossing detectors. The combining of the output of the zero crossing detectors is performed by he gate, circuit element 12, in FIG. 1. This combining results in a pulse trsin in which the pulses are equally spaced at intervals of 60° phase angle of the three phase power. Each of the three zero crossing detectors produce pulses at 180° phase angle of its input phases. Thus the resultant pulse spacing of these three outputs is 60°. Each pulse in this pulse train, initiates the generation of a sawtooth waveform as illustrated by voltage waveform E in FIG. 2. This function is performed by element 11 in FIG. 1, the sawtooth generator. The sawtooth voltage is compared to a reference signal and a control feedback signal, said control feedback signal derived from sensing the output developed by the polyphase digital controller. by the differential comparator and A-D converter which is element 10 in FIG. 1. The resultant waveform shown as F on FIG. 2 is a pulse width nodulated voltage, where the ratio of the pulse on time to the total available time, represents the percent of time a switching type device should be on, to achieve the desired output. This pulse width modulated waveform is used to operate gate, element 18 in FIG. 1, in conjunction with the clock generator, element 17 of FIG. 1; whose output provides a pulse train containing pulses whose number is proportional to the pulse width modulated pulse on time. This pulse train is converted to a binary count of the number of pulses appearing in it, by the 12 bit up counter, element 19, of FIG. 1. The output of this 12 bit up counter represents, in binary forms, the SCR off time measured from the zero crossing time.

The 12 bit binary count is used to set the 12 bit down counters, elements 21A, 21B and 21C of FIG. 1, associated with each phase. The output from the zero crossing detectors, elements 14A, 14B and 14C of FIG. 1, provide the "set" pulses for the down counters and this pulse also provides the "gate open" signal to the down counter input gate, element 20 of FIG. 1. The frequency divider, element 16, divides the output frequency of the clock generator, element 17, to provide the timing signal from the down counters to count. When the down counters reach zero, they supply a zero count signal to the gate, element 20 of FIG. 1, as a "close gate" signal, and to the SCR pre-amplifier, element 22, of FIG. 1. This signal is amplified by the SCR preamplifiers, elements 21 on FIG. 1, to provide the firing voltage to "turn on" the SCR to provide power to the load. Each of the wave forms G, H and I of FIG. 2 illustrates the ON time of each of the three SCRs as controlled by the power control circuit.

Referring to the description of the specific relationships between the circuit elements, it will be observed that the same control effects by the same circuit elements are applied equally to the control of each of the three phases. With this identical control effect applied to each of the three phases, their outputs will be balanced. If such an arrangement is employed to provide for conversion to DC, the output will contain a minimum ripple voltage. Additionally, such a balance will minimize saturation effects in magnetic elements in the polyphase supply. The previous description of the circuit elements employed, has shown the majority of these elements are of digital circuit types. This extensive use of digital elements, enhances the ease of using integrated circuits to perform all control circuit functions. The use of integrated circuits provides the advantage of performing circuit functions at a lower cost per part, and since fewer parts are to be interconnected and mounted, significant cost reductions are realized from the use of integrated circuits. Additionally, digital circuit elements are precise in performance, with environmental conditions having a minimal effect on performance. The result is an SCR control which has the characteristics of low cost, small physical size, precise control and a reliable life performance. The polyphase digital controllers as shown, can provide DC output from the controlled SCR outputs, thus providing a precisely regulated conversion of polyphase power to DC power. This embodiment may also provide controlled polyphase output for AC power. The circuit shown was for a three phase controller in this particular arrangement. Such arrangement was chosen to accomplish the results with the simplest form. This form may be varied to provide the same advantages for other than three phase polyphase SCR control and although we have shown a particular arrangement of elements we may change the arrangement of elements, that is, as to the relationship of one element to another without departing from the spirit of this invention.

The invention described in detail in the foregoing specification is subject to changes and modifications without departing from the principle and spirit thereof. The terminology used is for purposes of description and not of limitation; the scope of the invention being defined in the claims.

What is claimed is:

1. A polyphase digital power control circuit in which polyphase power is controlled by binary counting technique which provides equal voltage loading of each phase comprising:

a. a polyphase control transformer to provide appropriate input voltage with D.C. isolation and a minimum of phase distortion, b. zero crossing detectors to receive the input voltage from said polyphase control transformer and to produce a pulse output when the cyclic voltage appearing at theinput reverses its polarity, c. an OR gate to receive the pulse output from said said zero crossing and to produce a synchronizing pulse output each time an input appears at any one of its inputs, d. a sawtooth generator to receive said synchronizing pulse output from said OR gate and to produce a linear varying output voltage that is returned to its starting level with each said synchronizing pulse at its input, e. a differential comparator and analog to digital converter combination to receive said varying output from said sawtooth generator and to combine same with the differential sum of a reference input and and a control feedback input to produce a variable width pulse output, said control feedback signal derived by sensing the output developed by the polyphase digital controller, f. a clock generator to produce pulses at a constant rate, g. an AND gate to receive the pulse output from said clock generator and the output signal of said differential comparator and analog to digital converter combination to produce output pulses of a varying number which is a function of the sum of said inputs to said AND gate, h. a frequency divider to provide a frequency division of its input derived from said clock's output, i. a 12 bit up counter to receive the pulse from said AND gate and the OR gate output to provide a binary coded output of the sum of the number of pulses appearing at its inputs, j. a 12 bit down counter, set gate and signal gate for each of said polyphases, said set gate of each 12 bit down counter receiving said binary coded output which is distributed to each phase controlled and which provides one input for each of said set gates where each down counter has its counting cycle and the transfer of said binary coded information is initiated by a pulse output from the zero crossing detector associated with that phase, which provides a second input to said set gate and an input to said signal gate, said signal gate's opening permits the said down counter to count the output pulses from said frequency divider which provides a second input to said signal gates, said frequency divider provides a frequency division of its input derived from the output of said clock, equal to the number of phases of the power input, each of said signal gates whose output provides the input to each of said down counters in turn providing a pulse output when the interval count reaches zero, said each down counter's pulse outputs provide a third input to said respective signal gates, k. SCR pre-amplifiers to receive the pulse output from said 12 bit down counters, said SCR preamplifiers perform the function of raising their respective inputs to a value level sufficient to fire the SCR to start conduction which continues until the associated phase reverses polarity, said SCR remaining non-conducting for a time which is proportional to the differential between the reference and the control feedback, all phase control elements being supplied with binary control data from the same source, thus balance's maintained between all phases.

2. In a device according to claim 1 in which the 12 bit counter may be substituted with a counter of greater or lesser bit count in both the up counter and down counter but both counters must contain the same number of bits and the clock rate of the clock generator output must be similarly changed.

3. A polyphase power control circuit according to claim 1 in which the comparison means produces a proportional control signal which is of binary character.

4. In a polyphase control circuit according to claim 1 in which the SCR turn on delay control is of a binary character.

* * * * *